United States Patent
Kong et al.

(10) Patent No.: US 9,727,253 B2
(45) Date of Patent: Aug. 8, 2017

(54) DATA PROCESSING METHOD, APPARATUS, AND SYSTEM

(71) Applicant: Huawei Technologies Co., Ltd., Shenzhen (CN)

(72) Inventors: Chao Kong, Nanjing (CN); Xiangming Cao, Nanjing (CN); Zhenghua Xu, Nanjing (CN)

(73) Assignee: Huawei Technologies, Co., Ltd., Shenzhen (CN)

( * ) Notice: Subject to any disclaimer, the term of this patent is extended or adjusted under 35 U.S.C. 154(b) by 50 days.

(21) Appl. No.: 14/812,747

(22) Filed: Jul. 29, 2015

(65) Prior Publication Data
US 2016/0034204 A1 Feb. 4, 2016

(30) Foreign Application Priority Data

Jul. 30, 2014 (CN) .......................... 2014 1 0369968

(51) Int. Cl.
*G06F 3/06* (2006.01)
*G06F 13/16* (2006.01)

(52) U.S. Cl.
CPC ............ *G06F 3/0611* (2013.01); *G06F 3/064* (2013.01); *G06F 3/0673* (2013.01); *G06F 13/161* (2013.01)

(58) Field of Classification Search
None
See application file for complete search history.

(56) References Cited

U.S. PATENT DOCUMENTS

| | | |
|---|---|---|
| 5,530,828 A | 6/1996 | Kaki et al. |
| 2003/0033493 A1 | 2/2003 | Cismas |
| 2004/0153612 A1 | 8/2004 | Mutz et al. |
| 2006/0023792 A1 | 2/2006 | Cho et al. |

(Continued)

FOREIGN PATENT DOCUMENTS

| | | |
|---|---|---|
| JP | H064399 A | 1/1994 |
| JP | H08186826 A | 7/1996 |

(Continued)

OTHER PUBLICATIONS

Foreign Communication From a Counterpart Application, European Application No. 15178835.5, Extended European Search Report dated Dec. 23, 2015, 6 pages.

(Continued)

*Primary Examiner* — Gurtej Bansal
*Assistant Examiner* — Stephanie Wu
(74) *Attorney, Agent, or Firm* — Conley Rose, P.C.

(57) ABSTRACT

A data processing method, including dividing a to-be-processed data block into multiple data subblocks, where a quantity of the multiple data subblocks is less than or equal to a quantity of banks Banks of a memory, and performing an access operation on a bank corresponding to each data subblock of the to-be-processed block, where different data subblocks of the block are corresponding to different Banks of the memory. In an embodiment of the present disclosure, a processor maps different data subblocks of a to-be-processed Block to different Banks, so that a quantity of inter-page access operations on a same Block may be reduced, thereby improving memory access efficiency when two contiguous memory access operations access different pages of a same bank.

12 Claims, 5 Drawing Sheets

(56) References Cited

U.S. PATENT DOCUMENTS

| | | | |
|---|---|---|---|
| 2006/0190670 A1 | 8/2006 | Nakanishi et al. | |
| 2008/0104340 A1 | 5/2008 | Shih | |
| 2009/0002864 A1* | 1/2009 | Duelk | G06F 12/0607 360/48 |
| 2009/0172318 A1 | 7/2009 | Sugai et al. | |
| 2009/0248994 A1* | 10/2009 | Zheng | G06F 9/5016 711/151 |
| 2013/0166860 A1 | 6/2013 | Owaki et al. | |

FOREIGN PATENT DOCUMENTS

| | | | |
|---|---|---|---|
| JP | 20040520658 A | 7/2004 | |
| JP | 2006042364 A | 2/2006 | |
| JP | 2007299211 A | 11/2007 | |
| JP | 2009157680 A | 7/2009 | |
| WO | 02095601 A1 | 11/2002 | |
| WO | 2005038655 A1 | 4/2005 | |
| WO | 2012035616 A1 | 3/2012 | |

OTHER PUBLICATIONS

Partial English Translation and Abstract of Japanese Patent Application No. JPA2004520658, Dec. 9, 2016, 53 pages.

Partial English Translation and Abstract of Japanese Patent Application No. JPA200642364, Dec. 9, 2016, 52 pages.

Partial English Translation and Abstract of Japanese Patent Application No. JPA2007299211, Dec. 9, 2016, 30 pages.

Partial English Translation and Abstract of Japanese Patent Application No. JPA2009157680, Dec. 9, 2016, 60 pages.

Partial English Translation and Abstract of Japanese Patent Application No. JPH64399, Dec. 9, 2016, 20 pages.

Partial English Translation and Abstract of Japanese Patent Application No. JPH8186826, Dec. 9, 2016, 20 pages.

Foreign Communication From a Counterpart Application, Japanese Application No. 2015-150665, Japanese Office Action dated Oct. 11, 2016, 3 pages.

Foreign Communication From a Counterpart Application, Japanese Application No. 2015-150665, English Translation of Japanese Office Action dated Oct. 11, 2016, 4 pages.

* cited by examiner

DATA PROCESSING METHOD, APPARATUS, AND SYSTEM

CROSS-REFERENCE TO RELATED APPLICATION

This application claims priority to Chinese Patent Application No. 201410369968.1, filed on Jul. 30, 2014, which is hereby incorporated by reference in its entirety.

TECHNICAL FIELD

The present disclosure relates to the field of computer technologies, and in particular, to a data processing method, apparatus, and system.

BACKGROUND

A double data rate type three (DDR3) synchronous dynamic random access memory (SDRAM) is now a most widely applied memory product, and has huge advantages on costs, bandwidth, power consumption, and the like.

A DDR3 SDRAM generally uses burst access with a length of eight, and one time of burst access refers to one read (RD) or write (WR) command for a memory. For example, if a data bit width of a DDR3 chip is 16 bits and a burst length is eight, where the data bit width herein refers to a total width of a data line between a processor and the DDR3 chip and the burst length refers to a length of data accessed in one time of burst access, 16 bit×8=128 bit data is returned by each time of reading.

A DDR3 SDRAM memory body generally includes eight different banks (Bank), each Bank is divided into multiple rows, each row is called a page (Page), and each page is further divided into multiple columns. As shown in FIG. 1, a typical reading process is: a processor sends, to a DDR3 SDRAM, an activation (ACT) command, and a Bank address (the Bank address is identified by BA0 in the figure) and a row address (such as RAx and RAy in the figure) that are to be accessed, to open a page, and then sends a RD command and an in-page column address (such as CAx in the figure); and read operations may be performed continuously within one page by using read commands, but in an inter-page case, it is necessary to send a precharge (PRE) command first to close a currently opened page and send an ACT command again to open a corresponding page. In this way, when switching is performed between pages in a same Bank, a latency of tRTP+tRP+1 clock cycles is needed between two read commands, where, tRTP is a time from sending a read command to sending a precharge PRE command (that is, a close Bank command), tRP is a time needed for closing a Bank, and at least one clock cycle is needed from sending an ACT command to sending a read command. As shown in FIG. 2, a typical writing process is: a processor sends, to a DDR3 SDRAM, an ACT command, and a Bank address and a row address that are to be written into; and write operations may be performed continuously within one page by using write commands, but in an inter-page case, it is necessary to send a PRE command first to close a currently opened page and send an ACT command again. In this way, when switching is performed between pages in a same Bank, postponing of WL+4+tWR+tRP clock cycles is needed between two WR commands, where WL is a time of a write latency, that is, after a write command is sent, WL clock cycles still need to elapse before a write operation is started, afterwards, there is a write time of four clock cycles, tWR is a write recovery time after the write operation is performed, and tRP is a time for closing a Bank.

It may be seen from the foregoing process that when two contiguous memory access operations access different pages of a same Bank, after an access operation is performed, a relatively long latency is needed before a later access operation is performed, which severely reduces access efficiency.

SUMMARY

The embodiments of the present disclosure provide a data processing method and apparatus, so as to resolve a problem in the prior art that access efficiency is relatively low when two contiguous memory access operations access different pages of a same Bank.

In a first aspect, a data processing method is provided, where the method includes dividing a to-be-processed data block (Block) into multiple data subblocks, where a quantity of the multiple data subblocks is less than or equal to a quantity of banks Banks of a memory, and performing an access operation on a Bank corresponding to each data subblock of the to-be-processed Block, where different data subblocks of the Block are corresponding to different Banks of the memory.

With reference to the first aspect, in a first possible implementation manner, the dividing the to-be-processed Block into the multiple data subblocks includes determining the to-be-processed Block according to a preset Block size and a memory access instruction, and dividing the Block into the multiple data subblocks according to a preset data subblock size.

With reference to the first possible implementation manner of the first aspect, in a second possible implementation manner, the preset Block size is a product of the quantity of Banks of the memory, a memory data bit width, one burst length, and a quantity of bursts; and the preset data subblock size is a product of the memory data bit width, one burst length, and the quantity of bursts.

With reference to the first aspect, or the first or second possible implementation manner of the first aspect, in a third possible implementation manner, the performing an access operation on a Bank corresponding to each data subblock of the to-be-processed Block includes determining, according to a Bank access sequence corresponding to a Bank that is accessed before the to-be-processed Block is accessed and a correspondence between each data subblock of the to-be-processed Block and a Bank of the memory, a Bank access sequence corresponding to the to-be-processed Block, and accessing, according to the Bank access sequence corresponding to the to-be-processed Block, the Bank corresponding to each data subblock of the to-be-processed Block, so that a time interval between two times of access to a same Bank of the memory is longest.

In a second aspect, a data processing apparatus is provided, where the apparatus includes a dividing module configured to divide a to-be-processed Block into multiple data subblocks, where a quantity of the multiple data subblocks is less than or equal to a quantity of banks Banks of a memory, and an access module configured to perform an access operation on a Bank corresponding to each data subblock of the to-be-processed Block, where different data subblocks of the Block are corresponding to different Banks of the memory.

With reference to the second aspect, in a first possible implementation manner, the dividing module is configured to: determine the to-be-processed Block according to a preset Block size and a memory access instruction; and divide the Block into the multiple data subblocks according to a preset data subblock size.

With reference to the first possible implementation manner of the second aspect, in a second possible implementation manner, the preset Block size is a product of the quantity of Banks of the memory, a memory data bit width, one burst length, and a quantity of bursts; and the preset data subblock size is a product of the memory data bit width, one burst length, and the quantity of bursts.

With reference to the second aspect, or the first or second possible implementation manner of the second aspect, in a third possible implementation manner, the access module is configured to: determine, according to a Bank access sequence corresponding to a Bank that is accessed before the to-be-processed Block is accessed and a correspondence between each data subblock of the to-be-processed Block and a Bank of the memory, a Bank access sequence corresponding to the to-be-processed Block; and access, according to the Bank access sequence corresponding to the to-be-processed Block, the Bank corresponding to each data subblock of the to-be-processed Block, so that a time interval between two times of access to a same Bank of the memory is longest.

In a third aspect, a data processing system is provided, where the system includes a processor, a memory, and a data line, the memory includes multiple banks Banks, and when the system operates, the processor communicates with the memory through the data line, and the processor is configured to divide a to-be-processed Block into multiple data subblocks, where a quantity of the multiple data subblocks is less than or equal to a quantity of banks Banks of the memory, and perform an access operation on a Bank corresponding to each data subblock of the to-be-processed Block, where different data subblocks of the Block are corresponding to different Banks of the memory.

With reference to the third aspect, in a first possible implementation manner, the processor is configured to determine the to-be-processed Block according to a preset Block size and a memory access instruction, and divide the Block into the multiple data subblocks according to a preset data subblock size.

With reference to the first possible implementation manner of the third aspect, in a second possible implementation manner, the preset Block size is a product of the quantity of Banks of the memory, a memory data bit width, one burst length, and a quantity of bursts; and the preset data subblock size is a product of the memory data bit width, one burst length, and the quantity of bursts.

With reference to the third aspect, or the first or second possible implementation manner of the third aspect, in a third possible implementation manner, the processor is configured to determine, according to a Bank access sequence corresponding to a Bank that is accessed before the to-be-processed Block is accessed and a correspondence between each data subblock of the to-be-processed Block and a Bank of the memory, a Bank access sequence corresponding to the to-be-processed Block; and access, according to the Bank access sequence corresponding to the to-be-processed Block, the Bank corresponding to each data subblock of the to-be-processed Block, so that a time interval between two times of access to a same Bank of the memory is longest.

In the embodiment of the present disclosure, after receiving a memory access instruction, a processor divides a to-be-processed Block into multiple data subblocks, and maps different data subblocks to different Banks; in this way, inter-page access operations on a same Block may be reduced, thereby improving memory access efficiency.

DESCRIPTION OF EMBODIMENTS

Figure 1:
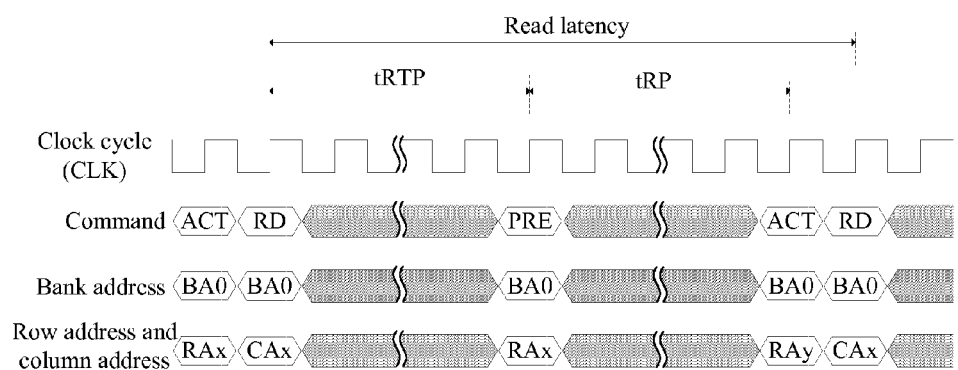
FIG. 1 is a schematic diagram of performing a read operation on a DDR3 SDRAM according to the prior art.
Figure 2:
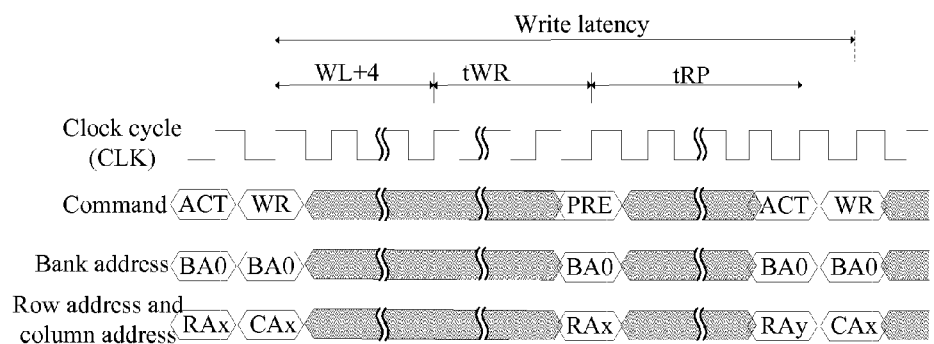
FIG. 2 is a schematic diagram of performing a write operation on a DDR3 SDRAM according to the prior art.
Figure 3:
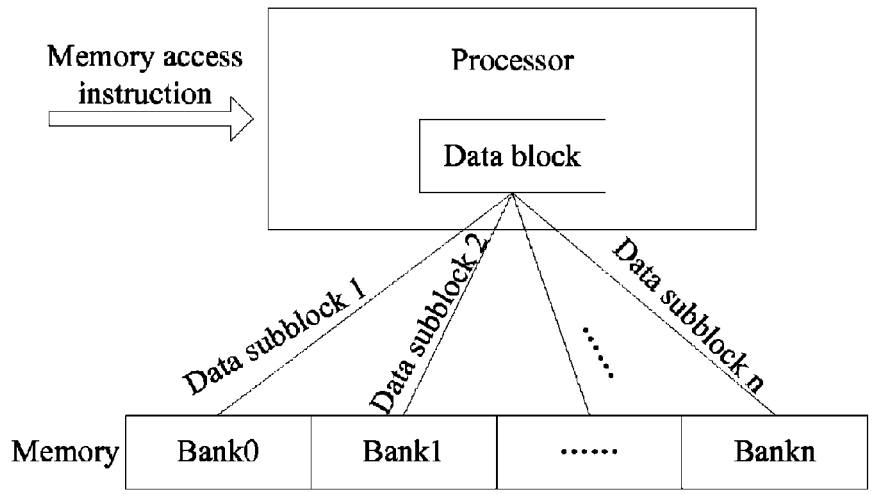
FIG. 3 is a schematic diagram of performing data processing according to an embodiment of the present disclosure.

As shown in FIG. 3, FIG. 3 is a schematic diagram of performing data processing according to an embodiment of the present disclosure. In the embodiment of the present disclosure, after receiving a memory access instruction, a processor does not map a Block to a single Bank according to a conventional manner, but instead divides the Block into multiple data subblocks, and maps different data subblocks to different Banks. In this way, inter-page access operations on a same Block may be reduced, thereby improving memory access efficiency.

The following describes in further detail the embodiments of the present disclosure with reference to the accompanying drawings of the specification.

Figure 4:
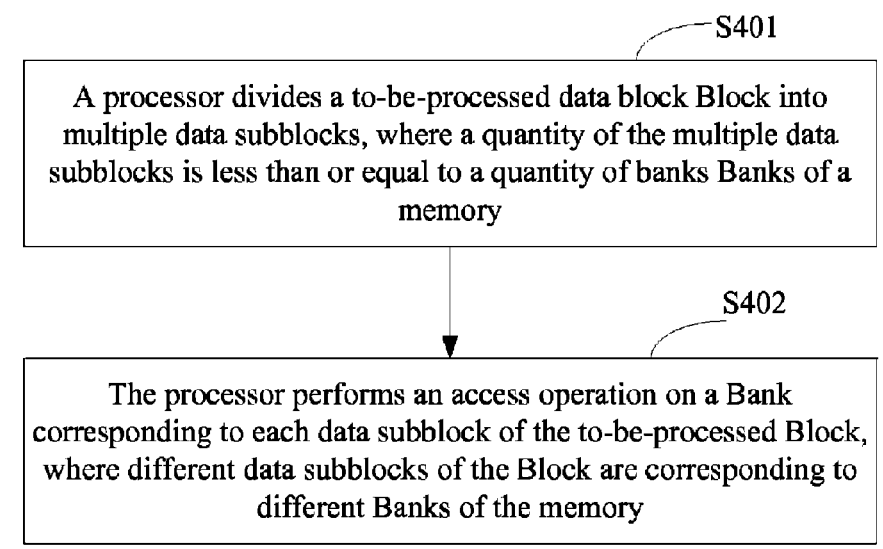
FIG. 4 is a flowchart of a data processing method according to Embodiment 1 of the present disclosure.

As shown in FIG. 4, FIG. 4 is a flowchart of a data processing method according to Embodiment 1 of the present disclosure, where the method includes the following steps S401: A processor divides a to-be-processed Block into multiple data subblocks, where a quantity of the multiple data subblocks is less than or equal to a quantity of banks Banks of a memory.

In this step, after receiving a memory access instruction, the processor may determine each to-be-processed Block according to to-be-processed data indicated by the memory access instruction and a preset Block size, and divide each Block into multiple data subblocks according to a preset size of each data subblock. The memory access instruction refers to a data processing operation request triggered by a computer program or an operator. After the program or the operator sends the data processing operation request to the processor, the processor stores temporarily, in the memory, the to-be-processed data indicated by the data processing operation request (that is, writes the data into the memory). When the processor is idle, the to-be-processed data is read out, and is output after being processed. An access operation in the embodiment of the present disclosure includes a read operation or a write operation performed on the memory.

Figure 5:
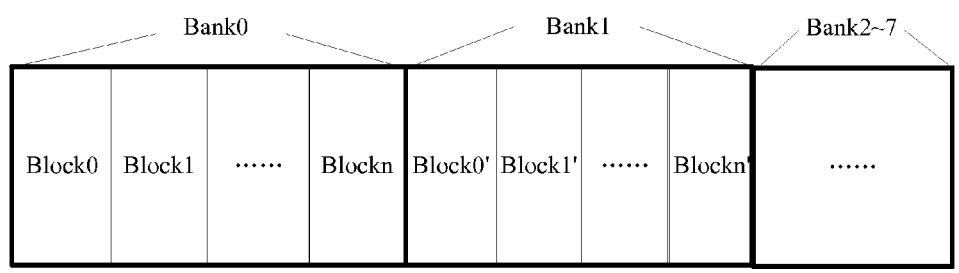
FIG. 5 is a schematic diagram of a mapping relationship in a conventional memory access operation.

As shown in FIG. 5, in a conventional memory access operation, a processor generally maps one Block to a same Bank of a memory, which is very likely to result in an inter-page access operation on a same Bank. In the embodiment of the present disclosure, the processor divides each Block into multiple data subblocks, and maps each data subblock of the Block to a different Bank as introduced in the following step S402. In the embodiment of the present disclosure, a waiting delay of switching between different Banks is much less than a waiting delay of page switching in a same Bank, and has a relatively small effect on memory access efficiency. In addition, in the embodiment of the present disclosure, a data subblock size may be set properly, so that duration of performing an access operation for the data subblock is equal to the waiting delay of switching between different Banks, and therefore seamless switching between different Banks may be implemented, further improving the memory access efficiency.

S402: The processor performs an access operation on a Bank corresponding to each data subblock of the to-be-processed Block, where different data subblocks of the Block are corresponding to different Banks of the memory.

In this step, the processor may perform a memory access operation for each data subblock successively according to a mapping relationship between each data subblock and a Bank. For example, when a memory write operation is performed for a Block, each data subblock of the Block is written successively into a Bank corresponding to the data subblock; and when a memory read operation is performed on a Block, each data subblock of the Block is read out successively from a Bank corresponding to the data subblock, and is output after being processed.

Figure 6:
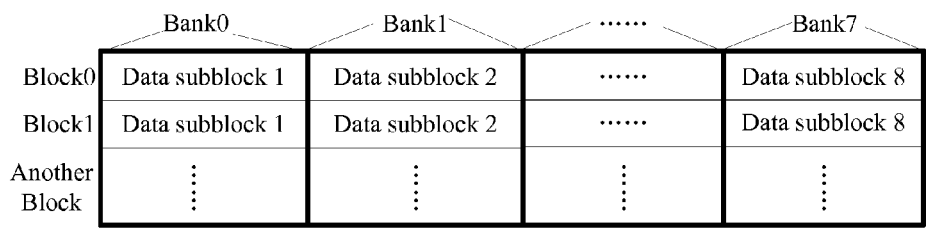
FIG. 6 is a schematic diagram of a mapping relationship in a memory access operation according to an embodiment of the present disclosure.

That a DDR3 SDRAM generally includes eight different Banks is used as an example. As show in FIG. 6, FIG. 6 is a schematic diagram of mapping multiple data subblocks of each Block to different Banks separately according to an embodiment of the present disclosure. In the embodiment of the present disclosure, different data subblocks of a same Block are corresponding to different Banks of the memory, and a same Bank may be corresponding to data subblocks of multiple different Blocks. For example, data subblocks 1-8 of Block0 are mapped to Banks0-7, respectively, and data subblocks 1-8 of Block1 are also mapped to the Banks0-7, respectively.

For example, a mapping manner shown in FIG. 6 is used, and different data subblocks of a same Block are mapped to different Banks, so that for a same Block, an access operation in which switching is performed between different Banks is implemented, thereby reducing a waiting delay of page switching in a same Bank, and improving the memory access efficiency.

A mapping relationship between each data subblock of a Block and each Bank of the memory may be predefined, and a Bank access sequence of the memory may be preset. That the quantity of Banks of the memory is eight is still used as an example, each data subblock of one Block, for example data subblocks 1-8, may be mapped successively to Banks (Bank0-Bank7) that are numbered in ascending order, or to Banks (Bank7-Bank0) that are numbered in descending order, and a Bank access sequence of the memory is preset as Bank0 to Bank7.

In a specific implementation process, in order to avoid as much as possible a waiting delay of page switching in a same Bank that is likely to occur, a time interval between two times of access to a same Bank of the memory may be made to be longest, that is, two access operations on a same Bank are spaced by a largest quantity of times of access to the other Banks. a Bank access sequence corresponding to the to-be-processed Block may be determined according to a Bank access sequence corresponding to a Block that is accessed before the to-be-processed Block is accessed, and for example, when a quantity of Banks of the memory is eight, a longest time of an interval between two access operation on a same Bank may be a time of accessing seven Banks. in S402, the performing the access operation on the Bank corresponding to each data subblock of the to-be-processed Block includes determining, according to a Bank access sequence corresponding to a Bank that is accessed before the to-be-processed Block is accessed and a correspondence between each data subblock of the to-be-processed Block and a Bank of the memory, a Bank access sequence corresponding to the to-be-processed Block, and accessing, according to the Bank access sequence corresponding to the to-be-processed Block, the Bank corresponding to each data subblock of the to-be-processed Block, so that a time interval between two times of access to a same Bank of the memory is longest.

For example, a memory includes eight Banks, a preset access sequence is from Bank0 to Bank7, Block1 is divided into four data subblocks, which are mapped to Bank0-Bank3, and Bank0-Bank3 corresponding to Block1 are accessed in sequence according to the preset access sequence. A next to-be-processed Block, Block2, is divided into eight data subblocks, which are mapped to Bank0-Bank7, if the Banks corresponding to the data subblocks of Block2 are accessed merely according to the preset access sequence, a time interval between two times of access to a same Bank is a time of accessing three Banks, for example, two access operations of accessing Bank0 are spaced by only a time of accessing Bank1-Bank3. In order that a time of an interval between two access operations on a same Bank is longest, a Bank access sequence corresponding to a current to-be-processed Block may be determined according to a Bank access sequence for a previous Block. when an access operation is performed for Block1, Bank0-3 are accessed successively; then, an access operation is performed for Block2, data subblocks 1-8 of Block2 are corresponding to Bank0-7 respectively, and in order that a time interval between two access operations on a same Bank is longest, a Bank access sequence corresponding to Block2 is determined as Bank4, Bank5, Bank6, Bank7, Bank0, Bank1, Bank2, and Bank3. In this way, two access operations of accessing a same Bank are spaced by a time of accessing seven Banks.

It may be seen from the foregoing data processing steps in Embodiment 1 of the present disclosure, in the embodiment of the preset disclosure, different data subblocks of a same Block may be mapped to different Banks, but a quantity of Banks of a memory chip is fixed, and therefore in specific implementation, a Block size needs to be limited, so as to avoid that the inadequate quantity of Banks results in a situation in which it is inevitable that some data subblocks of the Block are mapped to a same Bank, increasing processing complexity. Meanwhile, because before a processor writes a data block Block into a memory, a starting address of the Block needs to be recorded, and in order to reduce a recording burden of the processor, a Block size cannot be set too small. As an optional implementation manner, a Block size may be first set equal to a page size, and a data subblock size may be set to a quotient of the Block size and the quantity of Banks of the memory chip.

In specific implementation, there is also a waiting delay when switching is performed between different Banks, and certainly, the waiting delay is far less than a waiting delay of page switching in a same Bank. In a preferred implementation manner of the present disclosure, seamless switching between different Banks may be implemented by setting a size of each data subblock properly, that is, duration of performing an access operation for one data subblock is just equal to a waiting delay of switching between different Banks. Embodiment 2 of the present disclosure gives a specific implementation manner.

Figure 7:
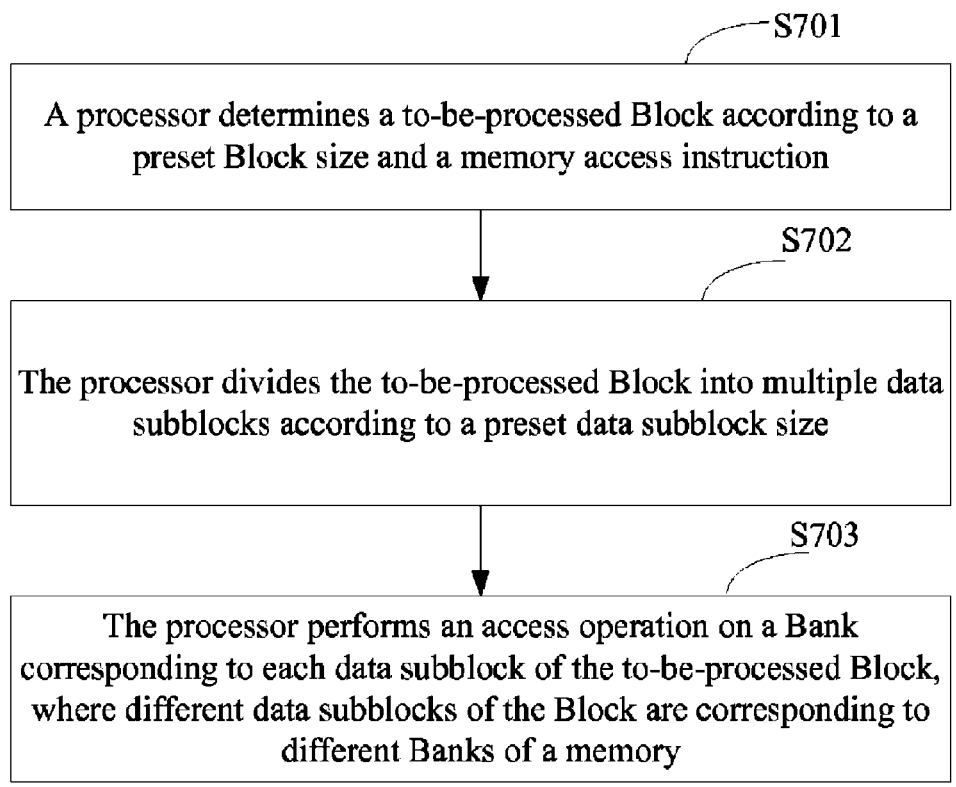
FIG. 7 is a flowchart of a data processing method according to Embodiment 2 of the present disclosure.

As shown in FIG. 7, FIG. 7 is a flowchart of a data processing method according to Embodiment 2 of the present disclosure, where the method includes S701: A processor determines a to-be-processed Block according to a preset Block size DQ×Burst_lengh×n×Bank_num and a memory access instruction, where DQ is a data line width of the memory, Burst_length is one burst length, n represents a quantity of bursts, and Bank_num is a quantity of Banks of a memory chip.

In the step, the to-be-processed Block is determined according to to-be-processed data indicated by the memory access instruction and the preset Block size. In specific implementation, there is a possibility that a size of the to-be-processed data indicated by the memory access instruction is not an integral multiple of the preset Block size. In the embodiment of the present disclosure, a size of the determined to-be-processed Block may be less than the preset Block size.

In the embodiment of the present disclosure, DQ×Burst_lengh×n×Bank_num is used as the preset data block Block size, and meanwhile a preset data subblock size is set as DQ×Burst_lengh×n. In this way, data subblocks of one Block are mapped to different Banks separately. Preferably, when determining the data subblock size, in order that the data subblock size meets a requirement for a waiting delay of switching between different Banks (that is, after the processor performs an access operation for one data subblock, the requirement for the waiting delay of switching between different Banks is just met, and a next data subblock may be accessed immediately), a value of n may be set properly. Generally, within a waiting delay of switching between different Banks, the processor may perform an access operation of two burst lengths, and therefore the value of n may be set to two. For example, when DQ is 16 bit, Burst_length is eight, and Bank_num is eight, the Block size is 16 bit/8×8×2×8=256 bytes (Byte, B for short).

S702: The processor divides the to-be-processed Block into multiple data subblocks according to a preset data subblock size DQ×Burst_lengh×n.

In the step, the processor divides a Block whose size is an integral multiple of the preset data subblock size into m data subblocks of the preset data subblock size, where m is the quantity of Banks of the memory chip. If a Block is not of an integral multiple of the preset data subblock size, after division is performed according to the preset data subblock size, a size of a last data subblock is allowed to be less than the preset data subblock size.

S703: The processor performs an access operation on a Bank corresponding to each data subblock of the to-be-processed Block, where different data subblocks of the Block are corresponding to different Banks of the memory.

In the step, the processor determines a mapping relationship between each data subblock of the Block and a Bank based on a principle that different data subblocks of a same Block are mapped to different Banks. In specific implementation, a rule of mapping between a data subblock and a Bank may be preset. For example, each data subblock of any Block is mapped successively, according to a logical sequence of the data subblock in the Block, to each Bank arranged according to a sequence number. For example, there are totally eight Banks, Bank0-Bank7, on the memory chip, and after a Block is divided into eight data subblocks, the data subblocks of the current Block are mapped successively to Bank0-Bank7. If there is a Block less than the preset Block size, mapping is performed continuously and sequentially until mapping of a last subblock is completed. For example, a Block is divided into only three data subblocks, and the data subblocks of the Block are mapped successively to Bank0-Bank2.

According to the data processing method provided by the embodiment, if DQ is 16 bit, and a burst length is eight, when a size of to-be-processed data is greater than or equal to 160 bytes, seamless switching between contiguous access operations may be implemented, memory access efficiency of a processor can reach greater than 90 percent (%), and access bandwidth is greater than 2.88 gigabytes per second (GB/s) (an access frequency is 800 M access cycles/s, and one access cycle generates DQ/8×2 of access data. An access bandwidth calculation manner is: DQ/8×800 M×2× 90%=2.88 (GB/s).

The foregoing 160 bytes are determined according to that a waiting delay of page switching in a same Bank is 40 clock cycles, and 40 clock cycles are equivalent to 10 burst lengths. Therefore, as long as the processor does not perform inter-page switching in a same Bank within the 10 burst lengths, the waiting delay of page switching in a same Bank will not be caused. As a result, within the 10 burst lengths, a quantity of data of an access operation performed by the processor is: DQ/8×Burst_lengh×10=160 B Based on a same inventive concept, embodiments of the present disclosure further provide a data processing apparatus and system corresponding to the data processing method, and because a problem-resolving principle of the apparatus and the system is similar to that of the data processing method of the embodiment of the present disclosure, for implementation of the apparatus and the system, reference may be made to implementation of the method, and repeated information is not provided herein.

Figure 8:
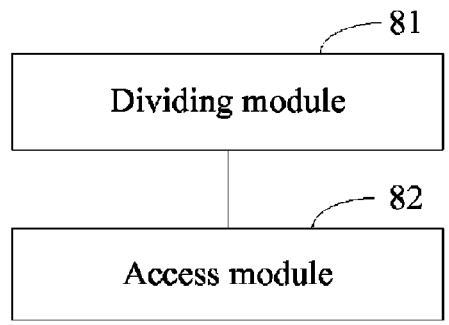
FIG. 8 is a schematic structural diagram of a data processing apparatus according to Embodiment 3 of the present disclosure.

As shown in FIG. 8, FIG. 8 is a schematic structural diagram of a data processing apparatus according to Embodiment 3 of the present disclosure, where the apparatus includes a dividing module 81 configured to divide a to-be-processed data block Block into multiple data subblocks, where a quantity of the multiple data subblocks is less than or equal to a quantity of banks Banks of a memory, and an access module 82 configured to perform an access operation on a Bank corresponding to each data subblock of the to-be-processed Block, where different data subblocks of the Block are corresponding to different Banks of the memory.

Optionally, the dividing module 81 is configured to: determine the to-be-processed Block according to a preset Block size and a memory access instruction; and divide the Block into the multiple data subblocks according to a preset data subblock size.

Optionally, the preset Block size is a product of the quantity of Banks of the memory, a memory data bit width, one burst length, and a quantity of bursts; and the preset data subblock size is a product of the memory data bit width, one burst length, and the quantity of bursts.

Optionally, the access module 82 is configured to determine, according to a Bank access sequence corresponding to a Bank that is accessed before the to-be-processed Block is accessed and a correspondence between each data subblock of the to-be-processed Block and a Bank of the memory, a Bank access sequence corresponding to the to-be-processed Block; and access, according to the Bank access sequence corresponding to the to-be-processed Block, the Bank corresponding to each data subblock of the to-be-processed Block, so that a time interval between two times of access to a same Bank of the memory is longest.

Figure 9:
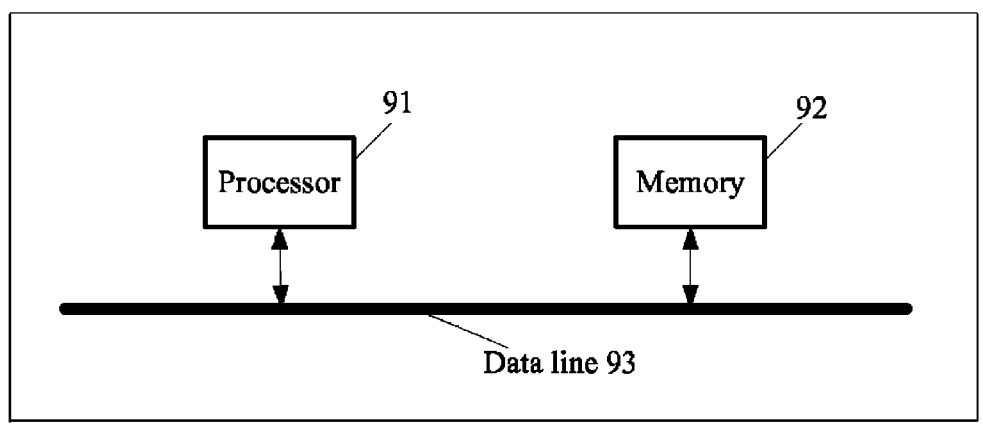
FIG. 9 is a schematic structural diagram of a data processing system according to Embodiment 4 of the present disclosure.

As shown in FIG. 9, FIG. 9 is a schematic structural diagram of a data processing system according to Embodiment 4 of the present disclosure. The system includes a processor 91, a memory 92, and a data line 93, the memory 92 includes multiple banks Banks, and when the system operates, the processor 91 communicates with the memory 92 through the data line 93. The processor 91 is configured to divide a to-be-processed data block Block into multiple data subblocks, where a quantity of the multiple data subblocks is less than or equal to a quantity of banks Banks of the memory, and perform an access operation on a Bank corresponding to each data subblock of the to-be-processed Block, where different data subblocks of the Block are corresponding to different Banks of the memory.

In the embodiment of the present disclosure, the processor 91 may be a central processing unit (CPU), and in this case the foregoing execution instruction executed by the processor 91 may be stored by the memory 92; and the processor may further be a programmable logic chip, and in this case the execution instruction may be implemented by means of a hardware deployment of the programmable logic chip.

Optionally, the processor 91 is configured to determine the to-be-processed Block according to a preset Block size and a memory access instruction; and divide the Block into the multiple data subblocks according to a preset data subblock size.

Optionally, the preset Block size is a product of the quantity of Banks of the memory, a memory data bit width, one burst length, and a quantity of bursts; and the preset data subblock size is a product of the memory data bit width, one burst length, and the quantity of bursts.

Optionally, the processor 91 is configured to determine, according to a Bank access sequence corresponding to a Bank that is accessed before the to-be-processed Block is accessed and a correspondence between each data subblock of the to-be-processed Block and a Bank of the memory, a Bank access sequence corresponding to the to-be-processed Block; and access, according to the Bank access sequence corresponding to the to-be-processed Block, the Bank corresponding to each data subblock of the to-be-processed Block, so that a time interval between two times of access to a same Bank of the memory is longest.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disk read-only memory (CD-ROM), an optical memory, and the like) that include computer-usable program code.

The present disclosure is described with reference to the flowcharts and/or block diagrams of the method, the apparatus (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some exemplary embodiments of the present disclosure have been described, persons skilled in the art can make changes and modifications to these embodiments once they learn the basic inventive concept. Therefore, the following claims are intended to be construed as to cover the exemplary embodiments and all changes and modifications falling within the scope of the present disclosure.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A data processing method, wherein the method comprises:
    determining a to-be-processed data block according to a preset data block size and a memory access instruction, wherein the preset data block size is a product of the quantity of banks of the memory, a memory data bit width, one burst length, and a quantity of bursts;
    dividing the to-be-processed data block into multiple data subblocks according to a preset data subblock size, wherein the preset data subblock size is a product of the memory data bit width, the one burst length, and the quantity of bursts, and wherein a quantity of the multiple data subblocks is less than or equal to a quantity of banks of a memory; and
    accessing a bank corresponding to each data subblock of the to-be-processed data block, wherein different data subblocks of the to-be-processed data block are corresponding to different banks of the memory.

2. The method according to claim 1, wherein performing the access operation on the bank corresponding to each data subblock of the to-be-processed data block comprises:
    determining, according to a bank access sequence corresponding to another data block that is accessed before the to-be-processed data block is accessed and a correspondence between each data subblock of the to-beprocessed data block and a bank of the memory, a bank access sequence corresponding to the to-be-processed data block; and accessing, according to the bank access sequence corresponding to the to-be-processed data block, the bank corresponding to each data subblock of the to-be-processed data block, so that a time interval between two times of access to the same bank of the memory is the longest.

3. The method according to claim 1, wherein determining the to-be-processed data block according to the preset data block size and the memory access instruction comprises determining, based on the preset data block size, each to-be-processed data block for to-be-processed data indicated by the memory access instruction.

4. The method according to claim 1, wherein after dividing the to-be-processed data block into the multiple data subblocks, the method further comprises mapping the multiple data subblocks successively to banks of the memory that are numbered in ascending or descending order.

5. A data processing apparatus, comprising:
a processor configured to:
determine a to-be-processed data block according to a preset data block size and a memory access instruction, wherein the preset data block size is a product of the quantity of banks of the memory, a memory data bit width, one burst length, and a quantity of bursts;
divide the to-be-processed data block into multiple data subblocks according to a preset data subblock size, wherein the preset data subblock size is a product of the memory data bit width, the one burst length, and the quantity of bursts, and wherein a quantity of the multiple data subblocks is less than or equal to a quantity of banks of a memory; and
perform an access operation on a bank corresponding to each data subblock of the to-be-processed data block, wherein different data subblocks of the to-be-processed data block are corresponding to different banks of the memory.

6. The apparatus according to claim 5, wherein the processor is further configured to:
determine, according to a bank access sequence corresponding to another data block that is accessed before the to-be-processed data block is accessed and a correspondence between each data subblock of the to-be-processed data block and a bank of the memory, a bank access sequence corresponding to the to-be-processed data block; and
access, according to the bank access sequence corresponding to the to-be-processed data block, the bank corresponding to each data subblock of the to-be-processed data block, so that a time interval between two times of access to the same bank of the memory is the longest.

7. The apparatus according to claim 5, wherein the processor is configured to determine, based on the preset data block size, each to-be-processed data block for to-be-processed data indicated by the memory access instruction.

8. The apparatus according to claim 5, wherein the processor is further configured to map the multiple data subblocks successively to banks of the memory that are numbered in ascending or descending order.

9. A data processing system, wherein the system comprises:
a processor;
a data line; and
a memory, wherein the memory comprises multiple banks, wherein when the system operates, the processor communicates with the memory through the data line, and wherein the processor is configured to:
determine a to-be-processed data block according to a preset data block size and a memory access instruction, wherein the preset data block size is a product of the quantity of banks of the memory, a memory data bit width, one burst length, and a quantity of bursts;
divide the to-be-processed data block into multiple data subblocks according to a preset data subblock size, wherein the preset data subblock size is a product of the memory data bit width, the one burst length, and the quantity of burst, and wherein a quantity of the multiple data subblocks is less than or equal to a quantity of banks of the memory; and
perform an access operation on a bank corresponding to each data subblock of the to-be-processed data block, wherein different data subblocks of the to-be-processed data block are corresponding to different banks of the memory.

10. The system according to claim 9, wherein the processor is configured to:
determine, according to a bank access sequence corresponding to another data block that is accessed before the to-be-processed data block is accessed and a correspondence between each data subblock of the to-be-processed data block and a bank of the memory, a bank access sequence corresponding to the to-be-processed data block; and
access, according to the bank access sequence corresponding to the to-be-processed data block, the bank corresponding to each data subblock of the to-be-processed data block, so that a time interval between two times of access to the same bank of the memory is the longest.

11. The system according to claim 9, wherein the processor is configured to determine, based on the preset data block size, each to-be-processed data block for to-be-processed data indicated by the memory access instruction.

12. The system according to claim 9, wherein the processor is further configured to map the multiple data subblocks successively to banks of the memory that are numbered in ascending or descending order.

* * * * *